Patented Oct. 28, 1947

2,429,671

UNITED STATES PATENT OFFICE 2,429,671

TREATMENT OF MATERIALS CONTAINING TANTALUM AND NIOBIUM

François Cuvelliez, Hoboken, near Antwerp, Belgium

No Drawing. Application December 2, 1938, Serial No. 243,548. In Great Britain December 15, 1937

Section 3, Public Law 690, August 8, 1946. Patent expires December 15, 1957

3 Claims. (Cl. 23—17)

1

This invention relates to a process for the treatment of materials containing tantalum and niobium, with a view to effecting the separation of the niobium from the tantalum.

It is known to treat ores or other metal-containing materials with halogen substances, more particularly with chlorine, with a view to converting the metals into their chlorides. The object of such a treatment is either a disintegration of the ore (that is rendering soluble some of its otherwise insoluble constituent substances), or to effect a separation of the individual component parts of the ore, or of the other raw material.

The separation is generally based upon the different volatilization temperatures of the various chlorides or halogen-compounds; the temperature of treatment may be gradually increased, or the volatilized chlorides may be separated by fractional condensation according to their volatilization temperature.

When primary materials are chlorinated, various effects may be obtained if other substances are added to the chlorine; for instance hydrogen or sulphur chlorides or carbon monoxide etc., or by mixing the substances to be chlorinated with coal or carbon-containing compounds.

It is known to separate in this way iron from chromium or tin and copper from tungsten etc.

It is also known to disintegrate ores or other primary materials containing tantalum and niobium by means of chlorine, and according to the temperature of the treatment it is possible to separate tin, iron, manganese, tungsten, titanium, silicon, etc., from tantalum and niobium. A separation of the niobium from the tantalum has not yet been obtained in this way.

It has now been ascertained, that a separation of the niobium from the tantalum may be obtained if the primary material containing the tantalum and niobium is treated in a current of chlorine gas or chlorine containing gases at a temperature not exceeding 1050° C., preferably at, or about, 1050° C. In some cases, it may be useful to add a substance or substances of basic character before the chlorine treatment, so as to improve the separation by binding more of the Ta$_2$O$_5$ than of the Nb$_2$O$_5$.

The mixture of raw material and substance or substances of basic character may be heated before the chlorine treatment in the presence of air or in an airtight receptacle. The heating may be also carried out in a reducing or in an inert atmosphere. Reducing gases containing carbon, such as CH$_4$, CO, etc., should preferably be avoided. Generally a treatment with admission

2 of air above the red heat is sufficient, preferably between 800 and 1200° C.

Lime in the form of calcium oxide may advantageously be used according to the present invention, as the base to be mixed with the primary material. However, other alkaline earth oxides, such as BaO, or alkali metal hydroxides such as KOH and NaOH may be used. These substances may be added in the form of carbonates, which are converted into oxides when the mixture is heated. The amount of lime is preferably so chosen that there should be about two molecules of calcium oxide for one molecule of tantalum oxide.

The mixture of ore and lime may be used in loose form or in briquette form.

The chlorination is best effected above red heat, between 800 and 1050° C. It may be carried out in a fixed vessel or in a rotary furnace. The heating may be indirect.

The primary materials containing tantalum and niobium may be subjected to a preliminary treatment for removing impurities, such as Sn, Mn, before they are treated according to the invention.

Example of Carrying the Invention Into Effect

An ore of tantalum and niobium (tantalite) containing approximately 24% of tantalum oxide and 44% of niobium oxide was mixed with approximately 7% of calcium oxide and heated at about 1000° C. with admission of air. The heated product was afterwards treated during 4 hours with chlorine at 1050° C., by allowing the chlorine to stream over the material which was placed in a flat receptacle made of ceramic material. In this way 70% of niobium in the form of chloride were volatilized, whilst practically the whole of the tantalum was retained in the residue without having been converted into chloride. In certain cases, over 80% of the niobium may be volatilized and separated from the tantalum. It would appear that the Ta$_2$O$_5$ is fixed to a combination out of which the Ta does not volatilize during the chlorination process. The present application has been limited to the use of chlorine as the halogen reagent. It should be noted that there are many practical difficulties to the utilization of other halogen gases.

I claim:

1. A process for the treatment of materials containing tantalum and niobium for obtaining a separation of the niobium from the tantalum, in which the primary material containing tantalum and niobium is mixed with a substance of basic character from the class consisting of the oxides, hydroxides and carbonates of the alkali and alkaline earth metals and mixtures of these substances, is treated with chlorine gas at between 800° and about 1050° C. so as to convert the niobium into volatile niobium chloride and the niobium chloride is separated as a gas from the residue of ore containing the tantalum.

2. A process for the treatment of materials containing tantalum and niobium for obtaining a separation of the niobium from the tantalum, in which the primary material containing tantalum and niobium is mixed with calcium oxide, is treated with chlorine gas at between 800° and about 1050° C. so as to convert the niobium into volatile niobium chloride and the niobium chloride is separated as a gas from the residue of ore containing the tantalum.

3. A process for the treatment of materials containing tantalum and niobium in oxide form for obtaining a separation of the niobium from the tantalum, in which the primary material containing tantalum and niobium is treated with chlorine gas at about 1050° C. thus converting niobium alone into volatile niobium chloride and in which the volatile niobium chloride is separated from the tantalum.

FRANÇOIS CUVELLIEZ.

REFERENCES CITED

The following references are of record in the file of this patent:

UNITED STATES PATENTS

| Number | Name | Date |
|---|---|---|
| 1,434,486 | D'Adrian | Nov. 7, 1922 |
| 1,822,266 | Becket | Sept. 8, 1931 |
| 2,140,801 | Leeman | Dec. 20, 1938 |

FOREIGN PATENTS

| Number | Country | Date |
|---|---|---|
| 29,014 | Australia | Oct. 15, 1931 |